No. 653,472. Patented July 10, 1900.
H. H. CUTLER.
CONTROLLER FOR DYNAMOS OR GENERATORS.
(Application filed Jan. 29, 1900.)
(No Model.)
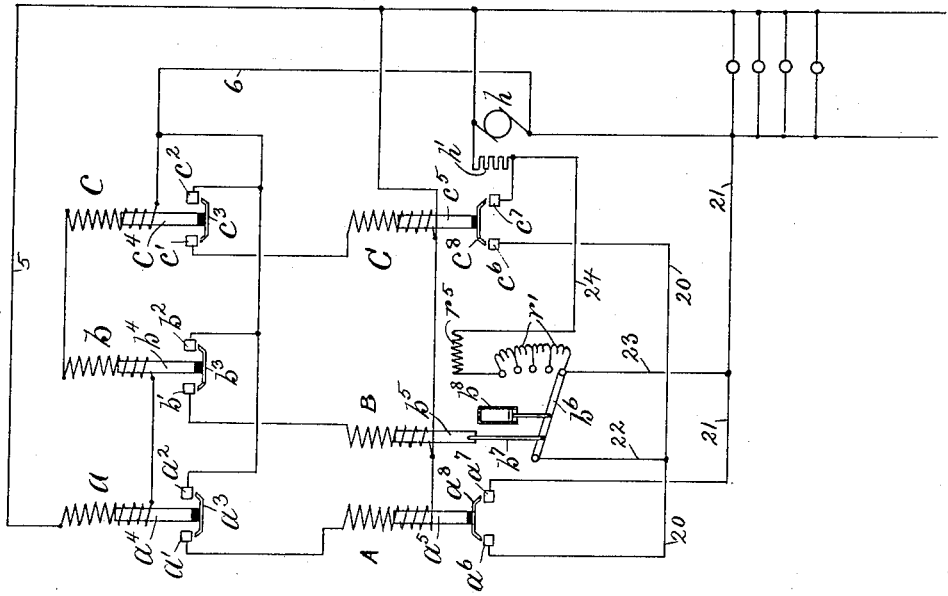
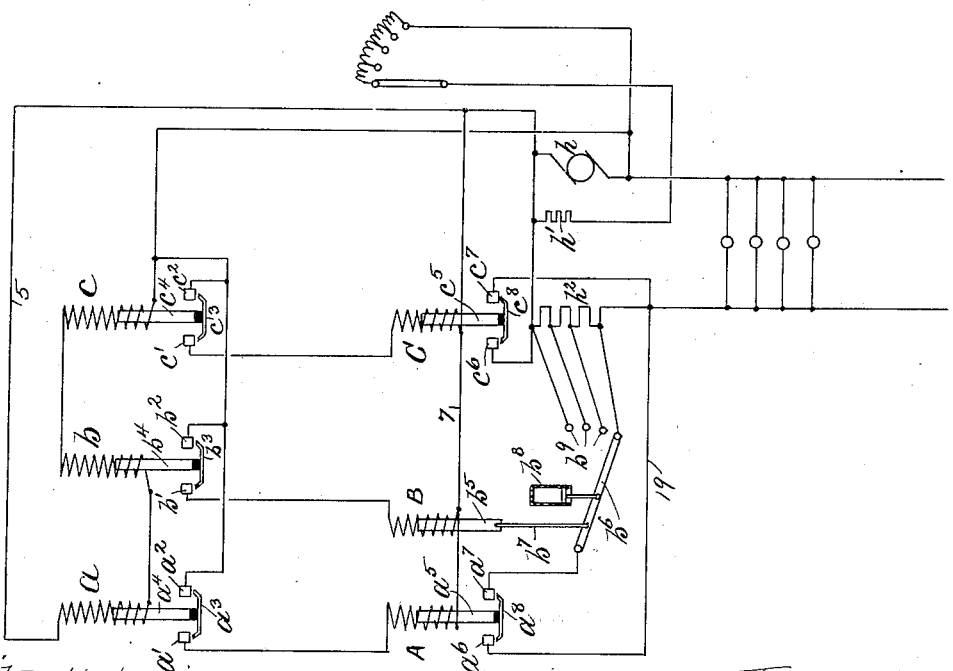

UNITED STATES PATENT OFFICE.

HENRY H. CUTLER, OF MILWAUKEE, WISCONSIN.

CONTROLLER FOR DYNAMOS OR GENERATORS.

SPECIFICATION forming part of Letters Patent No. 653,472, dated July 10, 1900.

Original application filed August 24, 1899, Serial No. 728,265. Divided and this application filed January 29, 1900. Serial No. 3,125. (No model.)

*To all whom it may concern:*

Be it known that I, HENRY H. CUTLER, a citizen of the United States, residing at Milwaukee, in the county of Milwaukee and State of Wisconsin, have invented a certain new and useful Improvement in Controllers for Dynamos or Generators, of which the following is a full, clear, concise, and exact description, reference being had to the accompanying drawings, forming a part of this specification.

My invention relates to a controller for dynamos or generators, my object being to provide means whereby the voltage of a dynamo or generator supplying a working circuit may be regulated and controlled to maintain the voltage of the generator constant within prearranged limits.

In an application filed by me August 24, 1899, Serial No. 728,265, I have illustrated and described and claimed generically a regulator or controller for dynamo-electric machines embodying the general principle of the regulator embraced in the present application. In said prior application I have claimed the generator as applied to dynamo-electric machines generally, and as illustrating the underlying principle of the generic invention I have disclosed in said application the regulator as adapted to an electric motor, and have also inserted in said application specific claims drawn to the regulator as applied to an electric motor. As originally filed said application also disclosed the specific application of the regulator to a dynamo or generator, and the subject-matter relating to the regulator as applied to a dynamo or generator has been taken from said principal application and forms the subject-matter of the present application, which is a division of said application.

In accordance with the present invention I provide means for varying the voltage of the generator within prearranged limits, and in addition thereto I provide means for checking any rise of voltage above the prearranged limit and for checking any fall of voltage below the prearranged limit. For controlling these several means I preferably employ a plurality of solenoids adapted to respond to the different voltages of the generator, which solenoids serve, when energized, to control the voltage-varying means of the generator. I usually associate the regulator with the field-coils of the generator, whereby the strength of the field may be regulated to thereby maintain the voltage of the machine constant under varying loads. In generators having a series or compound winding I preferably associate the regulator with a series field-winding provided with sections, which may be cut into and out of circuit step by step to provide the gradual regulation, while the rise or fall of the voltage beyond the prearranged limits may be prevented by cutting the field-winding wholly out of circuit or into circuit, as required, thereby producing the material changes of the voltage-varying means, which will at once check the rise or fall of the voltage. Where the regulator is applied to a shunt-wound generator, I preferably associate the regulator with a resistance in circuit with the shunt-field, the cutting of which resistance into and out of circuit varies the current through the shunt-field, thereby regulating the voltage of the machine.

Throughout the specification and claims I have employed the term "solenoid" with its broad significance as comprehending both electromagnets having a fixed core and a movable armature, and "solenoids," strictly so called, having a movable core.

I have illustrated my invention in the accompanying drawings, in which—

Figure 1 is a diagram illustrating my invention applied to a generator having a compound field-winding. Fig. 2 is a view of my invention as applied to a shunt-wound generator.

Like characters refer to like parts in both the figures.

In Fig. 1 I have illustrated my invention as applied to a generator having a compound winding, the series field being formed in sections. The solenoids $a\ b\ c$ are connected in parallel with the armature. The solenoids A B C are likewise connected in parallel with the armature. The series field-winding $h^2$ of the generator is formed in sections which are connected with the terminals $b^9$, over which the contact-arm $b^6$ is adapted to move, contact $b^6$ being connected, as before, with the core of solenoid B. The contact $a^6$ of solenoid A is connected by conductor 19 with one end of the series winding $h^2$, and contact $a^7$ is connected with contact-arm $b^6$. Contact $c^6$ is connected with one end of the series winding $h^2$, and contact $c^7$ is connected with the opposite end.

The operation is as follows: Assuming that it is desired to maintain the voltage at one hundred and ten volts, in which case the solenoids $a\ b\ c$ will be adjusted to respond, respectively, to one hundred and nine, one hundred and ten, and one hundred and eleven volts, when the generator is started and the voltage rises to one hundred and nine volts solenoid $a$ is energized, thereby energizing solenoid A, and plate $a^8$ is moved into contact with contacts $a^6\ a^7$, thereby connecting contact-arm $b^6$ in circuit. As the voltage rises to one hundred and ten volts solenoids $b$ and B are energized and contact-arm $b^6$ is moved over the terminal $b^9$, thereby short-circuiting the sections of the series field-winding step by step. The current from the armature $h$ after passing through a portion of the series winding $h^2$ will pass over contact-arm $b^6$, contacts $a^7\ a^8\ a^6$, conductor 19, thence through the working circuit back to the armature, a portion of the sections of the series field-winding being thus short-circuited and removed from circuit. If the voltage continues to rise and reaches one hundred and eleven volts, solenoids $c$ and C are energized, thereby moving the plate $a^8$ into engagement with contacts $c^6\ c^7$ and short-circuiting the series field-winding entirely, thereby removing all of the field-winding from circuit and immediately checking the rise of voltage. As the voltage falls below one hundred and eleven volts solenoids $c$ and C are deënergized, and the alternate energizing and deënergizing of solenoids $b$ B serve to regulate the voltage within limits. Any increased load tending to decrease the voltage below one hundred and nine volts deënergizes solenoid A, thereby suddenly cutting all of the series winding into circuit, while any increase above one hundred and eleven volts at once removes all of the series field-winding from circuit. The solenoid B thus serves to regulate the voltage of the generator within the prearranged limits, while the solenoids A and C, respectively, prevent the voltage from passing the prearranged limits.

In Fig. 2 I have illustrated the controller of my invention as applied to a generator having a shunt-field, the controller being arranged to carry the shunt-field strength, and thereby regulate the voltage of the machine. The solenoids $a$ A $b$ B $c$ C are connected in circuit, as in Fig. 1. The contact $a^6$ of solenoid A is connected by conductor 20 with contact $c^6$ of solenoid C. The contact $a^7$ is connected by conductor 21 with one side of the armature $h$ of the generator. The contact-arm $b^6$ is connected by conductor 22 with conductor 20, and one end of resistance $r'$ is connected by conductor 23 with conductor 21. Contact $c^7$ is connected with one end of the shunt-field $h'$ and is also connected by conductor 24 with the end of a resistance $r^5$, the opposite end of which resistance is connected with the end of the variable resistance $r'$.

The solenoids $a\ b\ c$ are adjusted to respond to, say, one hundred and nine, one hundred and ten, and one hundred and eleven volts, respectively. When the generator is started, the solenoids are all deënergized, and the circuit through the shunt-field $h'$ may be traced over contacts $c^7\ c^8\ c^6$, conductor 20, contacts $a^6\ a^8\ a^7$, and conductor 21 to the opposite side of the armature. The shunt-field is thus included in circuit without additional resistance. When the voltage rises above one hundred and nine volts, solenoids $a$ A are energized and contact-plate $a^8$ is separated from contacts $a^6\ a^7$. When the voltage rises above one hundred and ten volts, solenoids $b$ B are energized and contact-arm $b^6$ is moved over the terminals of resistance $r'$, thereby inserting more or less of the resistance $r'$ in series with the shunt-field $h'$. The circuit through the shunt-field $h'$ may now be traced through contacts $c^7\ c^8\ c^6$, conductors 20 and 22, contact-arm $b^6$, resistance $r'$, conductor 23, and conductor 21 to the opposite side of the armature. The contact-arm $b^6$ continues to cut in resistance, the movement being regulated by the dash-pot, and if the voltage continues to rise and exceeds one hundred and eleven volts solenoids $c$ C are energized, thereby separating contact-plate $c^8$ from contacts $c^6\ c^7$ and connecting resistance $r^5$ in circuit. The circuit through the shunt-field $h'$ may be traced over conductor 24 through resistances $r^5\ r'$ and conductors 23 and 21 to the opposite side of the armature. The whole of resistances $r'$ and $r^5$ are thus included in circuit, and the current through the shunt-field is materially reduced to at once check the rise of voltage of the machine. As the voltage falls below one hundred and eleven volts solenoid C is deënergized and resistance $r^5$ is removed from circuit and solenoid B is permitted to vary the resistance to regulate the voltage. Within short limits solenoid B thus regulates the voltage by being alternately energized and deënergized, thereby varying the resistance $r'$, while any sudden decrease of voltage results in deënergizing solenoid A, thereby short-circuiting the portion of resistance $r'$ in circuit and permitting a sudden increase of current through the shunt-field, thereby building up the voltage at once. Any material increase of voltage energizes solenoid C, thereby inserting resistances $r'$ and $r^6$ in circuit and materially cutting down the strength of the current through the shunt-field, thereby at once decreasing the voltage. The solenoid B thus serves to regulate the voltage within prearranged limits, while solenoid A checks any fall of voltage below the limit, and solenoid C checks any rise of voltage above the prearranged limit.

Having described my invention, what I claim as new, and desire to secure by Letters Patent, is—

1. The combination with an electric generator and a working circuit containing translating devices supplied thereby, of means for regulating the voltage thereof within prearranged limits, and auxiliary means for checking the rise or fall of said voltage beyond said prearranged limits, substantially as described.

2. The combination with an electric generator and a working circuit containing translating devices supplied thereby, of a solenoid for regulating the voltage thereof within prearranged limits, and auxiliary solenoids for checking the rise and fall of voltage beyond said limits, substantially as described.

3. The combination with an electric generator and a working circuit containing translating devices supplied thereby, of a solenoid for regulating the voltage thereof within prearranged limits, a solenoid for checking the rise of voltage above said limit, and a solenoid for checking the fall of voltage below said limit, substantially as described.

4. The combination with an electric generator, of means for varying the field strength thereof to regulate the voltage thereof within prearranged limits and means for checking the rise or fall of voltage beyond said prearranged limits, substantially as described.

5. The combination with an electric generator, of means for varying the field strength thereof to regulate the voltage of the generator within prearranged limits, means for materially and abruptly decreasing the field strength, and means for materially and abruptly increasing the field strength, substantially as and for the purpose set forth.

6. The combination with an electric generator, of a solenoid for varying the field strength thereof within prearranged limits, a solenoid for checking the rise of voltage above said limits, and a solenoid for checking the fall of voltage below said limits, substantially as described.

7. The combination with an electric generator, of means for regulating the voltage thereof within prearranged limits, means for checking the rise of voltage above said limit, means for checking the fall of voltage below said limits, and solenoids for controlling said respective means and responding to different voltages of the generator, substantially as described.

8. The combination with an electric generator, of means for regulating the voltage thereof within prearranged limits, means for checking the rise of voltage above said limits, means for checking the fall of voltage below said limits, and solenoids for controlling said respective means connected in parallel with the armature of the generator and arranged to respond to different voltages, substantially as described.

9. The combination with an electric generator, of means for regulating the voltage thereof within prearranged limits, means for checking the rise of voltage above said limits, means for checking the fall of voltage below said limits, and solenoids for controlling said respective means connected in series in a parallel branch around the armature of the generator and arranged to respond to different voltages, substantially as described.

In witness whereof I have hereunto subscribed my name in the presence of two witnesses.

HENRY H. CUTLER.

Witnesses:
W. CLYDE JONES,
M. R. ROCHFORD.